United States Patent [19]

Berliner

[11] 4,052,190
[45] Oct. 4, 1977

[54] SUSTAINED-RELEASE PLANT FOOD
[75] Inventor: Julius F. T. Berliner, Chicago, Ill.
[73] Assignee: Burnishine Products Inc., Skokie, Ill.
[21] Appl. No.: 680,453
[22] Filed: Apr. 26, 1976
[51] Int. Cl.² .............................................. C05G 3/04
[52] U.S. Cl. .......................................... 71/11; 71/27;
71/31; 71/34; 71/64 F; 71/DIG. 2
[58] Field of Search .................. 71/1, 11, 27, 34, 54,
71/64 E, 64 F, DIG. 2, 31

[56] References Cited
U.S. PATENT DOCUMENTS

| | | | |
|---|---|---|---|
| 3,933,458 | 1/1976 | Philipp | 71/11 X |
| 3,950,159 | 4/1976 | Fox et al. | 71/11 |
| 3,961,932 | 6/1976 | Miller | 71/DIG. 2 |

Primary Examiner—Frank A. Spear, Jr.
Assistant Examiner—Ferris H. Lander
Attorney, Agent, or Firm—Rummler & Snow

[57] ABSTRACT

Solid plant food formulations are disclosed which can be embedded in the soil adjacent but spaced from the plant roots for the release of primary plant nutrients and fertilizing components each time the plant is watered. The solid compositions contain fertilizer constituents, gel-forming materials and reactants therefore which, in the presence of water, combine to form a semi-permeable surface membrane or layer through which the plant nutrients migrate. Beneficial trace elements are also included. Sequestering agents are incorporated to enhance and insure the migration of the nutrients, particularly the trace elements, into the soil and preventing the formation of water-soluble products through metathetic reactions or reactions with the ingredients in the soil. The amount of nutrients released is proportionate to the volume of water applied.

The formulations, in one embodiment, are in the form of a cylindrical, solid stick that can be readily segmented into shorter pieces for small potted plants or one or more such solid sticks can be used for larger pots and larger plants. A probe for forming an appropriate hole of the required diameter and depth is provided to facilitate placement of the stick in the soil to the proper depth and insuring that the requisite amount of nutrients is available and furnished for the plant at each watering.

8 Claims, No Drawings

SUSTAINED-RELEASE PLANT FOOD

BACKGROUND OF THE INVENTION

It is known in the art to form fertilizer materials into the form of a stake or peg which is driven into the ground around a plant or tree to provide the necessary fertilizer each time it rains. Such stakes or pegs are formed of the pure fertilizer compositions and have no sustained release characteristics. Water-soluble nutrients applied in this manner or mixed with the soil provide an abundance of nutrients initially but are followed by progressively poorer results as the growing season progresses. This is especially apparent with blue grass which produce abundant first crops and poorer second and third crops when so treated. Much of the water-soluble nutrients is wasted by leaching during rains and watering.

Water-insoluble slow acting fertilizers, such as a urea-formaldehyde reaction product, which is relatively expensive form of nitrogen, seldom provide for the desired growth of the plants initially or for sustained growth over a normal growing season, because the fertilizer is not released in accordance with plant needs. Those essential nutrients as nitrogen and phosphorus are fixed and as a result considerable amounts of them never become available for plant growth.

The art has appreciated the desirability of controlled release of fertilizers for a long time, as shown by Ellis U.S. Pat. No. 847,749, dated 1907. A wide variety of coatings and porous films have been suggested for this purpose. These means have proven to be impractical because they release the fertilizer too rapidly or too slowly, or release all of the fertilizer at once or fail to release any of the fertilizer. Wax coatings have a tendency to burst and the particles have a tendency to agglomerate. Films on the other hand are not of uniform porosity, thus making controlled release impossible.

Work done for the Wisconsin Alumni Research Foundation by W. C. Dahnke, O. J. Attoe and associates reported in the Agronomy Journal, Vol. 55: 242-244 and Vol. 55: 495-499, 1963, has demonstrated that the placement of the feritilizer ammonium sulfate in perforated polyethylene bags or capsules effectively controlled the rate of release but did not significantly increase the yield or recovery of the constituents. The use of wax-coated pellets increased the recovery of nitrogen but did not affect the yield of such crops as corn. Some of these results are also reported in U.S. Pat. No. 3,059,379 as regards the perforated capsules wherein the rate of release of the fertilizer constituents is controlled by: (1) the number and size of the perforations per capsule; (2) the weight of fertilizer per capsule; (3) the solubility of the fertilizer constituents; and (4) the amount of soil moisture.

SUMMARY OF THE INVENTION

According to this invention, solid plant food formulations are provided which overcome the drawbacks and disadvantages of the prior art wherein relatively uniform and sustained release of plant food is attained over periods of time of as long as three months or more by using certain colloidal gums or resins and suitable reactants therefore as part of the solid fertilizer compositions to form a gel on being wetted through which the nutrients migrate into the soil.

In one embodiment the combination of certain natural gums having the property of forming a gel when reacted with a boron salt or salt of boric acid in the presence of water and a synthetic resin thickener having the property of forming a gel when reacted with an alkali in the presence of water, is used to produce the membrane layer responsible for the sustained release of nutrients upon and during each application of water. The membrane layer forms on the outside of the mass of plant food composition only when it is wetted whereby to allow migration or permeation of the water-soluble or chelated nutrients and trace elements along with the fertilizer materials from the body of the mass into the surrounding wetted soil.

The compositions include materials to react with the gums to form the insoluble gel structure so that the migration or permeation of nutrients continues at a rate that is proportionate to the amount of water present and gradually returns to a semi-solid state as the water is consumed by the plant or evaporates. In particular, the formulations include the combination of both natural and synthetic resins, reactants to form the gel therefrom and a sequestrant to accomplish the timed and sustained release of the trace elements.

An example composition is primarily made up of such plant nutrients as water-soluble potassium salts, ammonium salts and phosphates with suitable amounts of urea and required trace elements and the combination of a gum such as Guar gum, a synthetic resin, such as a polyacrylic acid, reactants such as borax and calcium compounds and balanced trace amounts of selected sequestrants to solubilize the heavy metal salts established as required plant nutrients with the necessary lubricants for forming a compressed stick of the formation that is easy to use. The formulations exhibit a minimum analysis of about 8% total nitrogen (about 6.4% ammoniacal nitrogen and 1.6% of other water soluble nitrogen). About 16% available phosphate (calculated as $P_2O_5$), and about 16% of soluble potash (calculated as $K_2O$) for a total of about 40% available primary plant food. Both all purpose and specific formulations are disclosed.

DESCRIPTION OF THE PREFERRED EMBODIMENTS

The fertilizer constituents used in the present invention comprise the conventional water-soluble chemical compounds providing available nitrogen, phosphorus, potassium in the forms of mono-ammonium phosphate, ammonium nitrate, potassium chloride, potassium phosphate, diammonium phosphate, monocalcium phosphate, urea, and ammonium sulfate, and other plant nutrients such as magnesium sulfate, calcium carbonate and sulfates of iron, zinc, manganese, copper and nickel and the like with suitable solubilizing sequestrants. The trace amounts of certain heavy metal salts used are maintained in soluble and available forms by the presence of sequestrants. Generally, the ratios of nitrogen (N), phosphate ($P_2O_5$) and potassium ($K_2O$) in the compositions can be varied, such as 12-12-12 or 16-8-8 and the like. Also, the alkalinity-acidity can be varied to meet the growing conditions of various types of plants. The ph of The compositions can be down to 3.5 and up to 8.0.

The fertilizer compositions can be pelleted, ball-shaped, particulate, or in stick form and contain growth promoting substances such as gibberellic acid, along with soil fungistats such as formaldehyde and paraformaldehyde, insoluble pigments for identification and lubricants and binders, the latter being included if necessary to facilitate the pelleting, ball or stick-formation by machinery. The formulations can be all-purpose or designed for particular plants, e.g. house plants, including African violets and woody plants such as trees or shrubs.

The gel-forming natural gum or resin can be any material which exhibits the property of forming a semipermeable gel by reaction in the presence of water with a reactant such as boric acid or salts of boric acid. For this purpose, both Guar gum and locust bean gum can be used with a reactant such as Borax (sodium tetraborate). Other natural gums which form semipermeable membrane-layers or gels under these conditions are known to one skilled in the art of employing thickening and gel-forming agents. About 1.5 wt.% to 3.5 wt.% of natural gum is used with about 0.5 wt.% to 1.0 wt.% of boron salt reactant.

The second portion of the semi-permeable membrane comprises about 0.5 to 1.5 wt.% of a synthetic resin which, in the presence of water and an alkali, such as calcium or magnesium salt, forms a somewhat stiffer and durable gel. For this purpose the various forms of polyacrylic acid are suitable. The proprietary product of Goodrich Chemical Company, known under the tradename Carbopol, which is a high mol. wt. polyacrylic acid, can be used. Gels formed by using a natural gum only have been found to function properly but are soft and are dissipated too rapidly to provide the necessary long-enduring sustained release properties for this invention. The proportions of natural gel and synthetic gel are not critical and generally the ratio of natural gum ot synthetic resin can vary between about 1:1 to 2:1 in the compositions. The accelerator or reactant salt therefore can be any alkali salt such as calcium carbonate, magnesium carbonate, etc., which can be added in amounts of 0.5 to 1.0 wt.% to the compositions. Generally, the compositions will contain sufficient calcium or magnesium salts as part of the nutrients to supply the reactant alkali.

The chelating or sequestering agents can be selected from a large group of such materials that are tailor-made to solubilize heavy metal ions in water solutions. For this purpose, about 0.5 to 2.0 wt.% of such proprietary compounds as "ORZAN", a lignen derivative, primarily composed of the sodium salt of lignic acid furnished by Crown Zellerbach Co., "VERSENE" the tetra sodium salt of the tetra-acetate of ethylene diamine, also referred to as "EDTA", furnished by Dow Chemical Co., and "SEQUESTRENE", the product of Ciba-Geigy, which is similar chemically to EDTA, as well as the related proprietary product known as "PERMACLEAR", manufactured by Onyx Chemical Co. can be used. Still another proprietary product, also a lignen salt, known as "MARASPERSE" by American Can Co. can be used. Other such agents include citric acid and salts thereof such as the ion and sodium salts gluconic acid and gluconates, ie sodium gluconate and tartaric acid and its salts, particularly the sodium salt.

Any of a large number of known soil fungistats can be used in amounts varying from 1.0 to 2.0 wt.%. Formaldehyde and paraformaldehyde are particularly effective for purposes of this invention. About 0.01 to 1.0 wt.% of a water-insoluble pigment is used for cosmetic and identification reasons. These can be paint pigments, metal oxides, chromates, etc. An agent to control the acidity produced as the plant consumes the available nitrogen, such as sodium silicofluoride, may be included to stabilize the ph and maintain it near neutral. About 0.20 to 0.35 wt.% of such an agent is sufficient.

In order to facilitate the extrusion, pelleting or molding of the compositions and form a discrete non-frangible product a lubricant in the amount of 2.5 to 7.5 wt.% such as stearic acid, stearic acid salts, ie calcium stearate or glycerol, can be used. Since the gel-forming agents have a binding affect on the composition a separate binder may not be necessary to hold the mass in a convenient stable form for the intended use. The foregoing ranges of ingredients are based on the total weight of the compositions. Co-acting ingredients such as the natural gum or the synthetic resin and their reactants are used in related amounts such that a sufficient amount of the reactant is present to promote proper gel formation. All ingredients are used in amounts to function as intended in conjunction with major portions of basic nutrients which are present in amounts up to about 86% by wt., including about 5.0 to 10% by weight of urea.

The following table lists example ingredients and also illustrates the percent by weight thereof used for an all-purpose fertilizer and a fertilizer designed for African violets.

TABLE I

| Ingredient | All-Purpose(wt.%) | African Violet |
|---|---|---|
| Potassium sulfate | 16.000 | 30.000 |
| Diammonium phosphate | 30.000 | 30.000 |
| Ammonium sulfate | 30.360 | 0.000 |
| Urea | 7.600 | 3.600 |
| Magnesium sulfate | 1.500 | 20.140 |
| Calcium carbonate | 1.500 | 1.500 |
| Polyacrylic acid | 0.920 | 1.224 |
| Guar gum | 2.082 | 2.770 |
| Versene | 0.820 | 1.087 |
| Borax | 0.410 | 0.544 |
| Ferrous sulfate | 0.980 | 0.980 |
| Zinc sulfate | 0.330 | 0.330 |
| Manganese sulfate | 0.730 | 0.730 |
| Copper sulfate | 0.280 | 0.280 |
| Nickel sulfate | 0.054 | 0.054 |
| Cobalt chloride | 0.082 | 0.082 |
| Strontium nitrate | 0.054 | 0.054 |
| Lithium nitrate | 0.054 | 0.054 |
| Ammonium molybdate | 0.108 | 0.108 |
| Ammonium bichromate | 0.027 | 0.027 |
| Sodium silicofluoride | 0.027 | 0.027 |
| Potassium Iodide | 0.054 | 0.054 |
| Paraformaldehyde | 0.615 | 0.816 |
| Pigment | 0.500 | 0.544 |
| Glycerol | 2.5 | 2.5 |

In order to form the fertilizer compositions of this invention the above ingredients are added in dry form to a vessel in any order and thoroughly mixed. The resulting mixture, after blending to a uniform consistency is molded, compressed into forms or extruded to form the desired solid shape. Once formed, the products are storage stable and can be packaged in a variety of ways. Macro pellets or balls can be formed and the compositions can be packaged in water-proof bags. In stick form the compositions can be packed in trays or boxes or blister packed on a cardboard piece. This latter method of packaging is convenient since the sticks can be broken into ¼ or ½ inch lengths for use with potted plants or one or more such sticks can be used for larger potted plants.

For example, the African violet composition of Table I can be formed into sticks weighing about 2 to 8 grams and measuring about ¾ to 1 ¼ cm. in diameter. For pots having a diameter of 2 inches to 3 ½ inch diameter, ¼ of a stick is used, while pots of 4 inches to 5 ½ inch diameter, a ½ stick is used. 6 inches to 8 inch pots would use one stick abd 9 inches to 10 inch pots, two sticks, etc. A hole is made in the soil at the extreme outside edge of the pot with a pencil or a special soil punch having indicia thereon indicating the depth of hole for ¼ stick, ½ stick and a whole stick.

The stick, or part thereof, is inserted into the hole and covered with soil. The plant is watered as usual. Each time the plant is watered, a portion of the nutrients is released into the soil. When the stick is totally exhausted, it is replaced with a new stick to continue the controlled release feeding program.

In order to further illustrate the invention leaching tests were conducted using both the general purpose and African violet sticks of the compositions shown in Table I. The procedure outlined in the following Example I was followed.

EXAMPLE I

Nine styrofoam pots of 4 inch diameter were filled with thoroughly washed sharp sand. The sand used showed no measurable nitrogen content. One half stick of the African violet composition was inserted in the above-described manner into three of the pots and ¼ stick of the all-purpose composition was inserted in three of the pots. The remaining three pots were untreated. Water, in amounts sufficient to thoroughly wet the sand and provide leaching through the drain hole at the bottom, was applied every three days to each container. A total of fifteen water applications was made, the exact timing for each watering being determined by the rate the sand in the pots had dried out.

The leachate was collected during the third and fifteenth irrigations or waterings or each pot. Since nitrogen is normally the most soluble and also the most quickly depleted element of a fertilizer, it was resonable that an analysis for the nitrogen content would provide an adequate measure of the fertilizer being supplied. Accordingly, the leachate samples were analyzed by the conventional microkjeldahl steam distillation method which involves reducing the nitrate with divardas alloy to ammonia, followed by distillation into boric acid with the ammonia being determined by titration with standardized sulfuric acid solution. The result is a determination of total nitrogen in the sample. The results are shown in Table II wherein the nitrogen is expressed as $N_2$. Treatments were replicated three times.

TABLE II

| Treatment | ANALYSIS OF DRAINAGE WATER SAMPLES | | | |
|---|---|---|---|---|
| | Third irrigation | | Fifteenth irrigation | |
| | Total N | Nitrates | Total N | Nitrates |
| Check | Not Detectable | | 0.6 | 2.6 |
| Check | | | Not Detectable | |
| Check | | | 0.1 | 0.6 |
| Afr. Viol | | | 0.8 | 3.6 |
| Afr. Viol | 7.5 | 33.8 | 2.2 | 4.8 |
| Afr. Viol | | | 7.5 | 33.8 |
| All Purp. | | | 25.5 | 114.8 |
| All Purp. | 59.1 | 266.0 | 59.1 | 266.0 |
| All Purp. | | | 20.4 | 91.9 |

While accelerated tests of this type do not necessarily duplicate the results that might be expected from treating plants growing in a soil mix, some conclusions can be drawn which serve to establish the duration of the fertilizer supplied by insertion of plant sticks.

Under normal household conditions, pot plants can be expected to receive water about once a week or thirteen times in a three month period. This frequency will of course be dependent upon the time of year, more frequent in summer, less in winter. Consequently, the 15 irrigations made in this test were adequate.

The analysis of drainage water after the third irrigation showed that the plant sticks were indeed working. After fifteen irrigations, the level of nutrient release had dropped in some of the containers. In two of the African violet samples, levels of N were only slightly higher than those in the check samples, indicating that the supply was nearly eliminated. The N levels being provided by the all purpose sticks were all quite high, showing only a 50% drop in the level of supply. This simple test establishes that the plant sticks of this invention do gradually supply nutrients. The African violet sticks last just about fifteen irrigations and could be said to provide fertilizer for about three months.

The all purpose sticks are still providing a high level of fertilizer at the end of the three months period. Admittedly the amount of water applied to each pot in this trial is in excess of the amount which a growing plant would receive.

Further evidence of the utility of the plant stick compositions of this invention is apparent from the following experiments.

EXAMPLE II

Three African violet plants identified as follows:

| No. | Color | Pot Size |
|---|---|---|
| A | White & Blue | 4" |
| B | Purple | 5" |
| C | Double Pink | 4" | had been in the same window location with southern exposure to sunlight for about three and one-half years. Each pot contained the original soil and the pots were positioned in an aluminum tray to catch excess water.

The plant in pot A had lost its original blooms after about 9 weeks and had not bloomed since that time. The plants B and C had always bloomed but the number of blooms and their size had gradually diminished over the years. None of the plants exhibited their original healthy appearance. Each plant had been watered about every 5th to 7th day with sufficient water to saturate the earth in the pot and cause an excess of water to run through into the aluminum pan. At each watering any excess water in the pan from the previous watering had evaporated or been consumed by the plants so the pan was dry.

Plants A and C were treated with one-half stick of the African violet composition of Table I. Plant B was treated with three-quarter stick of the African violet composition of Table I. Each portion of a stick was placed adjacent the inside edge of the pot. The aforedefined watering cycles were continued with the following results.

TABLE II

| Time Lapse | Plant A | Plant B | Plant C |
| --- | --- | --- | --- |
| 0 | No Blooms | 2 Blooms | 3 Blooms |
| 2 Wks. | 3 buds appeared | 1 bud - 2 blooms | 2 buds - 1 blooms |
| 4 Wks. | 3 buds & 2 blooms | 2 buds - 3 blooms | 1 bud - 3 blooms |
| 6 Wks. | 2 buds & 5 blooms | 5 blooms | 4 blooms |

At the end of 6 weeks all three plants showed an increase in foliage and a generally healthier appearance. Plant A increased in size, while the blooms of Plants B and C were more profuse and the size of the blooms increased as well as the brilliance of their colors.

Preferably the basic nutrients of the fertilizer compositions of this invention comprise no less than 40% by wt. and up to about 83.0 wt.% to 86.0 wt.% of the composition; the natural gums comprise about 2.0 to 3.0 wt.% of the composition; the synthetic resin comprises about 0.90 to 1.5 wt.% of the composition; and the gel promoting agents are present in amounts ranging from 0.4 to 1.0 wt.%. The trace elements and other special ingredients comprise up to about 4.0 wt.% of the composition with the fungistat being present in amounts ranging from 0.5 to 1.0 wt. %; the pigment (when used) constituting about 0.50 wt. % and the amount of lubricant is about 2.5 wt.%.

The invention contemplates compositions comprising a solid mass consisting essentially of water-soluble fertilizer salts and nutrients bound together with a mixture of a natural colloidal gum and a synthetic resin, both having the property of swelling into a water-soluble permeable or semi-permeable membrane layer on the outside of the mass in the presence of water and a gel promoting and sustaining agent therefore, the latter agent being present in amounts sufficient to form said membrane.

For special purposes such as the treatment of particular types of flowers or plants other ingredients known to be beneficial can be added or substituted for the various food and trace element constituents disclosed herein. Mixtures of the natural collidal gums, as well as mixtures of the gel promoting agents can be used. Any one or more of the trace elements can be omitted as well as the urea, pigments, binders and lubricants without detracting from the timed release properties of the compositions. Preferably the basic nutrients making up at least about 40% by wt. of the composition are included to supply the minimum requirements of nitrogen, available phosphate and potash for proper fertilizing action.

What is claimed is:

1. A solid substantially anhydrous controlled-release fertilizer composition adapted to release water-soluble constituents at a rate substantially proportional to the amount of water applied thereto comprising a physically bound mixture of:
   water soluble nutrient fertilizer constituents;
   a colloidal resinous material having the property of reversibly swelling into a water-insoluble permeable gel surface layer in the presence of water;
   a gel promoting and sustaining agent therefore; and
   a sufficient amount of a sequestering agent to solubilize and promote the migration of said trace elements through said permeable surface layer in the presence of water.

2. A solid substantially anhydrous controlled release fertilizer composition in accordance with claim 1 in which:
   said colloidal resinous material comprises a mixture of a natural colloidal gum and a synthetic resin.

3. A solid substantially anhydrous controlled release fertilizer composition in accordance with claim 2 in which:
   said natural colloidal gum is a member of the group consisting of Guar gum and locust beam gum and mixtures thereof; and
   said synthetic resin comprises high molecular weight polycarboxylic acid.

4. A solid substantially anhydrous controlled release fertilizer composition in accordance with claim 3 in which:
   the gel promoting and sustaining agent for said natural gum is a member of the group consisting of boric acid and salts thereof; and
   the gel promoting and sustaining agent for said polyacrylic acid is a member of the group consisting of calcium and magnesium salts and mixtures thereof;
   said gel promoting and sustaining agents being present in amounts sufficient to form and maintain a semi-permeable layer on the surface of said solid mixture at each application of water thereto.

5. A solid substantially anhydrous controlled release fertilizer composition in accordance with claim 1 in which:
   up to about 4.0 wt. % of said beneficial trace elements are present along with;
   up to about 2.0 wt. % of said sequestering agent.

6. A solid substantially anhydrous controlled release fertilizer composition adapted to release water-soluble constituents at a rate substantially proportional to the amount of water applied thereto comprising a physically bound mixture of:
   a major portion of water-soluble nutrient fertilizer constituents capable of providing available nitrogen, phosphate and potash as plant food;
   a minor portion of beneficial trace elements; and
   a carrier therefore comprising:
   a natural colloidal gum;
   a synthetic resin with
   a sufficient amount of a gel promoting and sustaining agent for said natural gum and said synthetic resin to reversably form a water-insoluble permeable layer in the presence of water on the surface of said solid mixture;
   the proportions of said synthetic resin being sufficient to impart body to said permeable layer; and
   a sufficient amount of a sequestering agent to solubilize and promote the migration of said trace elements through said permeable surface layer in the presence of water.

7. A solid substantially anhydrous controlled release fertilizer composition in accordance with claim 6 containing:
   up to about 83.0 wt. % of said water-soluble fertilizer constituents;
   up to about 4.0 wt. % of said trace elements;
   up to about 4.5 wt. % of said carrier comprising a major portion of said natural colloidal gum and a minor portion of said synthetic resin;
   up to about 1.0 wt. % of said gel promoting and sustaining agent;
   up to about 2.0 wt. % of said sequestering agent;

with the balance of the composition comprising a fungistat, and a lubricant to facilitate molding said solid mass.

8. A solid substantially anhydrous controlled release fertilizer composition in accordance with claim 7 in which:

said water soluble fertilizer constituents comprise the combination of urea, potassium sulfate, diammonium phosphate, ammonium sulfate, magnesium sulfate and calcium carbonate;

said trace elements comprise sources of iron, zinc, manganese, copper, nickel, cobalt, strontium, lithium, molybdenum, chromium;

said natural ciollidal gum is a member of the group consisting of Guar gum and locust beam gum and mixtures thereof;

said synthetic resin comprises polyacrylic acid;

said gel forming and sustaining agent for said natural gum is a member of the group consisting of boric acid, boric acid salts and mixtures thereof;

said gel forming and sustaining agent for said synthetic resin comprises an alkali of the group consisting of calcium salts and magnesium salts and mixtures thereof;

said sequestering agent is a member of the group consisting of sodium lignate, tetra sodium salt of the tetraacetate of ethylene diamine, citric acid, sodium citrate, iron citrate, gluconic acid, sodium gluconate, tartaric acid and sodium tartrate and mixtures thereof;

said fungistat is a member of the group consisting of formaldehyde and paraformaldehyde and mixtures thereof; and said lubricant is a member of the group consisting of glycerol, stearic acid, and stearic acid salts.

* * * * *